United States Patent [19]

Blesinger

[11] Patent Number: 4,645,885

[45] Date of Patent: Feb. 24, 1987

[54] ENDLESS CONVEYOR

[75] Inventor: Hans R. Blesinger, Neustadt, Fed. Rep. of Germany

[73] Assignee: Bellheimer Metallwerk GmbH., Fed. Rep. of Germany

[21] Appl. No.: 731,468

[22] Filed: May 7, 1985

[30] Foreign Application Priority Data

May 8, 1984 [DE] Fed. Rep. of Germany ....... 3417353

[51] Int. Cl.[4] .......................... B60L 5/38; B65G 17/18

[52] U.S. Cl. .................................... 191/45 R; 198/799

[58] Field of Search .............. 191/12 R, 12.2 R, 45 R; 198/468.5, 339.1, 691, 797-800, 803.6

[56] References Cited

U.S. PATENT DOCUMENTS

| | | | |
|---|---|---|---|
| 2,093,484 | 9/1937 | Schlotter | 198/803.6 X |
| 3,199,658 | 8/1965 | Graber et al. | 198/800 X |
| 3,363,958 | 1/1968 | Antram | 198/797 X |

FOREIGN PATENT DOCUMENTS 1285952 9/1969 Fed. Rep. of Germany .

*Primary Examiner*—Robert B. Reeves
*Assistant Examiner*—David F. Hubbuch
*Attorney, Agent, or Firm*—Mark P. Stone; F. Eugene Davis, IV

[57] ABSTRACT

In an endless conveyor with a plurality of load carriers, current collectors are associated with the load carriers and each exhibit an input part and a current collecting part. The current collecting part is mounted on the load carriers rotatably relative to the input part. Contact arms attached to the current collecting part are in contact with sliding contact rails. The current collected from the sliding contact rails passes via the contact arms, the current collecting part and sliding contacts connected to the current collecting part to the input part and from there to the respective load carrier.

10 Claims, 3 Drawing Figures

ENDLESS CONVEYOR

BACKGROUND OF THE INVENTION

The invention relates to an endless conveyor with a plurality of load carriers which are movable along a closed track and maintain their orientation during circulation for the transportation and/or storage of goods.

Endless conveyors of the abovementioned type, which are known as paternoster conveyors, are used primarily for storage purposes (DE-PS No. 12 85 952). They permit economical space accommodation of a large number of goods and/or parts on the load carriers, which can be transferred to a specific access station when required. Transport of the load carriers is made by driven chains, to which the load carriers are attached pivotably by support arms. In order to maintain the orientation of the load carriers constant during their circulation, they are provided with a jib which is guided in a guide rail.

SUMMARY OF THE INVENTION

The invention is based on the principle that a supply of electricity to the load carriers and the goods carried by them is desirable for certain specific applications. For example, it provides for the possibility of subjecting capacitors stored in the endless conveyor to an artificial aging process, or checking the quality of printed circuit boards stored on the load carriers. The transfer of control currents or data currents is also made possible. In this case, the electrical supply should be made in such a way that neither restricts the circulation of the load carriers as such, or the direction of circulation. This leaves open the possibility of transferring the respective load carrier to the access position by the shortest route. The object of the invention is to achieve this aim and to design an endless conveyor of the type considered in such way that the flexibility of the possibility of activating the individual load carriers for transferring them to the access position is not impaired by direct leads between the load carriers and the voltage source.

This object is achieved in the case of an endless conveyor of the type in question in that it is provided with at least one sliding contact rail and with at least one current collector arranged on at least one of its load carriers, which has an input part with at least one connecting line leading to the respective load carrier and a current collecting part mounted rotatably relative to the input part, at least one resilient contact arm in contact with the sliding contact rail and at least one sliding contact in contact with an annular contact track of the input part arranged on the current collecting part for each connecting line.

Due to the elimination of any direct connection between the voltage source and the individual load carriers attached to the driving chains, the endless conveyor according to the invention can convey the load carriers into their access position by the respective shortest route, as is known for appliances which have no electrical supply for the load carriers. Furthermore, its load carriers can circulate continuously, for example in order to render the parts stored upon them accessible for visual inspection.

The proposed solution presents particular advantages in the case of endless conveyors, the load carriers of which have support shafts which can be used to fasten the current collectors and which are connected integrally in rotation to jibs determining the position of the load carriers during circulation, the ends of which are in engagement with a guide rail which is arranged conjointly with the sliding contact rail(s) at one side of the conveyor. In this manner not only the sliding contact lines, but also all the parts necessary for the electrical supply, are readily accessible for maintenance purposes.

BRIEF DESCRIPTION OF THE DRAWINGS

Further features and particulars of the invention will be evident from the sub-claims and from the description, given below, of those parts of an endless conveyor which are material to the electricity supply and which are illustrated in the accompanying drawing, wherein:

DETAILED DESCRIPTION OF THE DRAWINGS

Figure 1:
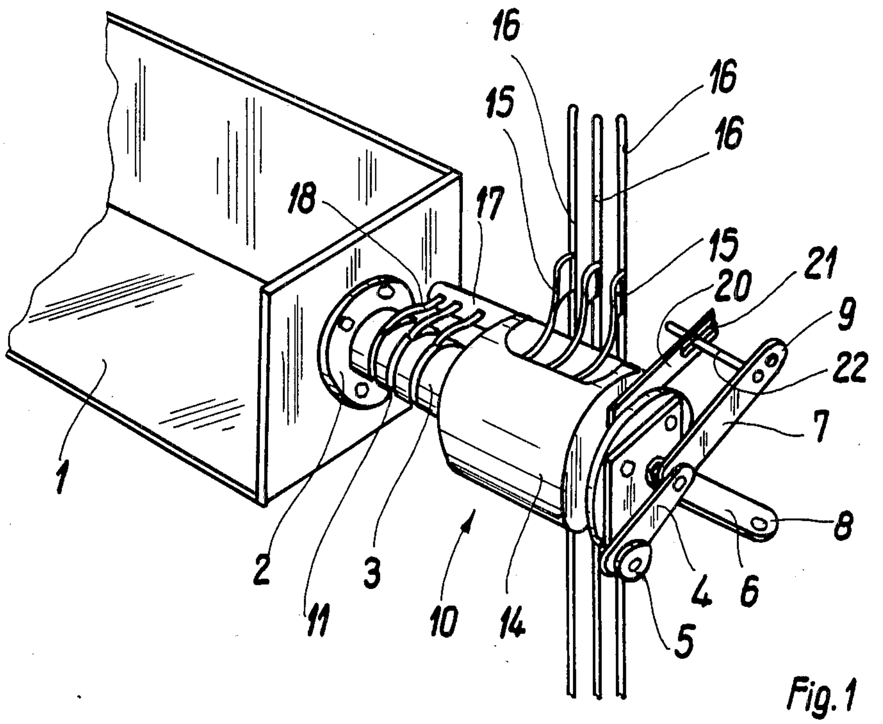
FIG. 1 shows diagrammatically a perspective view of a load carrier with a current collector arranged at one of its ends.

In the drawing, the reference numeral 1 designates a load carrier, to one end of which a support shaft 3 is attached by means of a flange 2. The shaft 3 may be rotatably mounted to the load carrier. Attached integrally in rotation to the free end of the support shaft 3 is a jib 4, which carries at its free end a guide roller 5, which is guided in a guide rail, not shown. Also mounted on the support shaft 3 are pivotable support arms 6 and 7, forming so-called scissors systems, the ends 8 and 9 of the arms being connected by bolts, not shown, to links of a drive chain, not shown. Endless conveyors with the features described above have been known for a long time.

In the exemplary embodiment illustrated, the support shaft 3 is constructed simultaneously as an input part of a current collector generally designated by reference numeral 10. The shaft 3 has three annular contact tracks 11. A current collecting part 14 is mounted rotatably on the support shaft 3 by means of two rolling contact bearings 12 and 13 (compare FIG. 2) The current collecting part 14 has three resilient contact arms 15 in the exemplary embodiment illustrated. The contact arms 15 are in contact with sliding contact rails 16.

Three sliding contacts 18, the ends of which press against the contact tracks 11, are attached to a projection 17 of the current collecting part 14.

By virtue of the described arrangement it is possible to collect main currents, control currents or data currents from the sliding contact rails 16 via the contact arms 15 and to pass them via the sliding contacts 18 to connecting lines 19 for the electrical supply of the carriers 1.

In order to ensure the satisfactory contact of the contact arms 15 against the sliding contact rails 16, the current collecting part 14 is provided with a follow-up lever 20, which exhibits at one end, a longitudinal slot 21 which is engaged by a driver 22 connected to the support arm 7.

Figure 2:
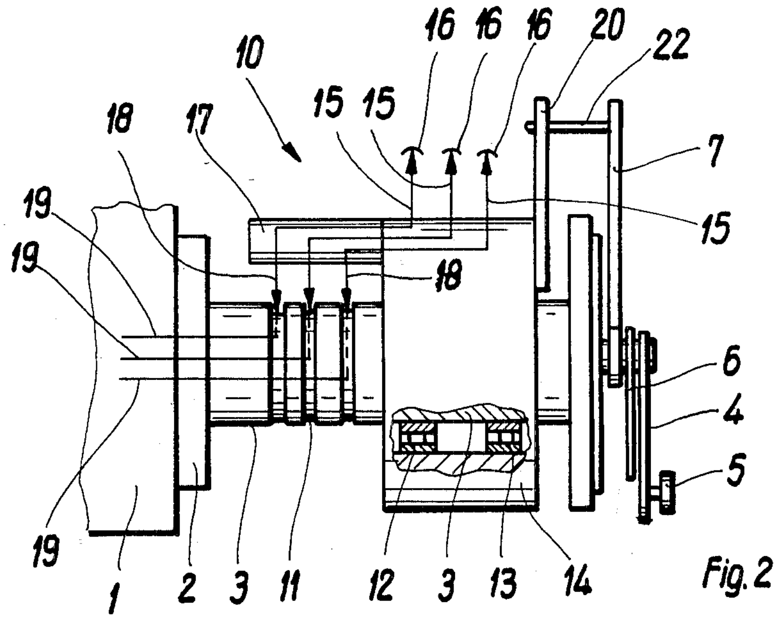
FIG. 2 shows highly diagrammatically the circuit diagram in the case of the arrangement according to FIG. 1.
Figure 3:
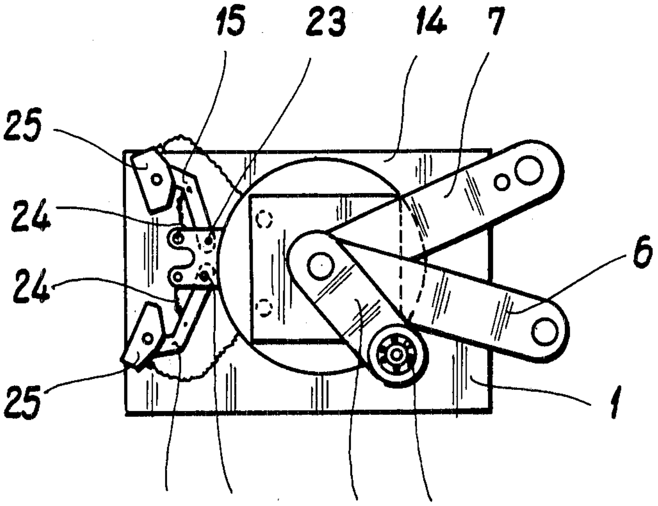
FIG. 3 shows a side elevation of an exemplary embodiment with two contact arms.

Whereas in the exemplary embodiment according to FIGS. 1 and 2, only one contact arm 15 is associated with each sliding contact rail 16, FIG. 3 shows another illustrative embodiment in which two contact arms 15 defining an angle between the contact arms are associated with each sliding contact rail. In this case, the contact arms are mounted pivotably on bolts 23 on the current collecting part. Springs 24 tend to draw them into the illustrated position. The actual contact shoes 25 are arranged pivotably at the end of the contact arms 15.

By the aforementioned development of an endless conveyor, principally serving for the space-saving storage of goods, its scope of use can be considerably broadened since not only storage tasks but also testing and control tasks can be carried out in extremely restricted space.

I claim:

1. An endless conveyor including a plurality of load carriers which are movable along a closed track and maintain their orientation during circulation for the transportation and/or storage of goods, characterised in that said endless conveyor includes at least one sliding contact rail (16) and at least one current collector (10) arranged on at least one of said load carriers (1), said at least one current collector having an input part (3) with at least one connecting line (19) leading to said at least one load carrier (1) and a current collecting part (14) rotatably mounted relative to said input part (3), at least one resilient contact arm (15) engaging the sliding contact rail (16) and at least one sliding contact (18) in contact with an annular contact track (11) of the input part (3) arranged on the current collecting part (14) for each connecting line (19).

2. Endless conveyor according to claim 1, characterised in that two resilient contact arms (15) defining an angle therebetween are arranged on the current collecting part (14) for each connecting line (19).

3. Endless conveyor according to claim 1 or 2, characterised in that the current collecting part (14) is rotatably mounted relative to the input part (3) by rolling contact bearings (12,13).

4. Endless conveyor according to claims 1 or 2, characterised in that the input part (3) is integrally rotatably connected to said at least one load carrier (1).

5. Endless conveyor according to claim 1, characterised in that the input part (3) forms a support shaft of said at least one load carrier (1).

6. Endless conveyor according to claim 5, characterised in that the input part (3) forming said support shaft is integrally rotatably connected to a jib (4) determining the position of the load carrier (1) during circulation, one end of said jib being in engagement with a guide rail which is arranged conjointly with the sliding contact rail (16) at one side of the conveyor.

7. Endless conveyor according to claim 5 or 6, characterised in that the input parts (3) forming said support shafts are each pivotably mounted on two support arms (6,7) arranged scissors fashion.

8. Endless conveyor according to claim 7, characterised in that in each case one of the support arms (6, 7) is in communication through a driver (22) with a follow-up lever (20) for the current collecting part (14).

9. Endless conveyor according to claim 8, characterised in that one end of the driver (22) is guided in a longitudinal slot (21).

10. Endless conveyor according to claim 1, characterised in that said sliding contact rail (16) is adapted to transfer a control current or data current to the load carriers (1).

* * * * *